United States Patent [19]

Wakabayashi

[11] Patent Number: 4,488,493
[45] Date of Patent: Dec. 18, 1984

[54] POWER-AND-FREE CONVEYOR

[75] Inventor: Takao Wakabayashi, Toyonaka, Japan

[73] Assignee: Nakanishi Metal Works Co., Ltd., Osaka, Japan

[21] Appl. No.: 494,087

[22] Filed: May 12, 1983

[51] Int. Cl.$^3$ .............................................. B61B 10/02
[52] U.S. Cl. .................................. 104/172 S; 104/89
[58] Field of Search ....................... 104/89, 91, 94, 95, 104/172 R, 172 S; 105/393; 280/401, 491 A, 638

[56] References Cited

U.S. PATENT DOCUMENTS

| 3,683,817 | 8/1972 | Macomber et al. | 104/172 S X |
| 3,720,172 | 3/1973 | Dehne | 104/172 S |
| 3,926,125 | 12/1975 | Orwin | 104/172 S X |

Primary Examiner—Randolph Reese
Attorney, Agent, or Firm—Armstrong, Nikaido, Marmelstein & Kubovcik

[57] ABSTRACT

A power-and-free conveyor comprising a carrier including front, rear and intermediate free trolleys at least three in number, a first connecting bar supported by the intermediate free trolley and either one of the front and rear free trolleys, a rail provided on the first connecting bar and extending along the conveyor line, at least two roller trap portions formed in the rail and spaced apart by a predetermined distance longitudinally of the rail, a second connecting bar supported by the first connecting bar and the other of the front and rear free trolleys, and a roller supported by the second connecting bar as projected thereabove and rollingly movable along the rail; and a roller releasing device for releasing the roller from the trap portion and returning the roller onto the rail. For the transport of an article, the roller is caused to fall into the trap portion of the rail most proximate to the second connecting bar. When the carrier is to be retained in a standby position at an accumulation section, the roller is caused to fall into the trap portion of the rail remotest from the second connecting bar.

6 Claims, 8 Drawing Figures

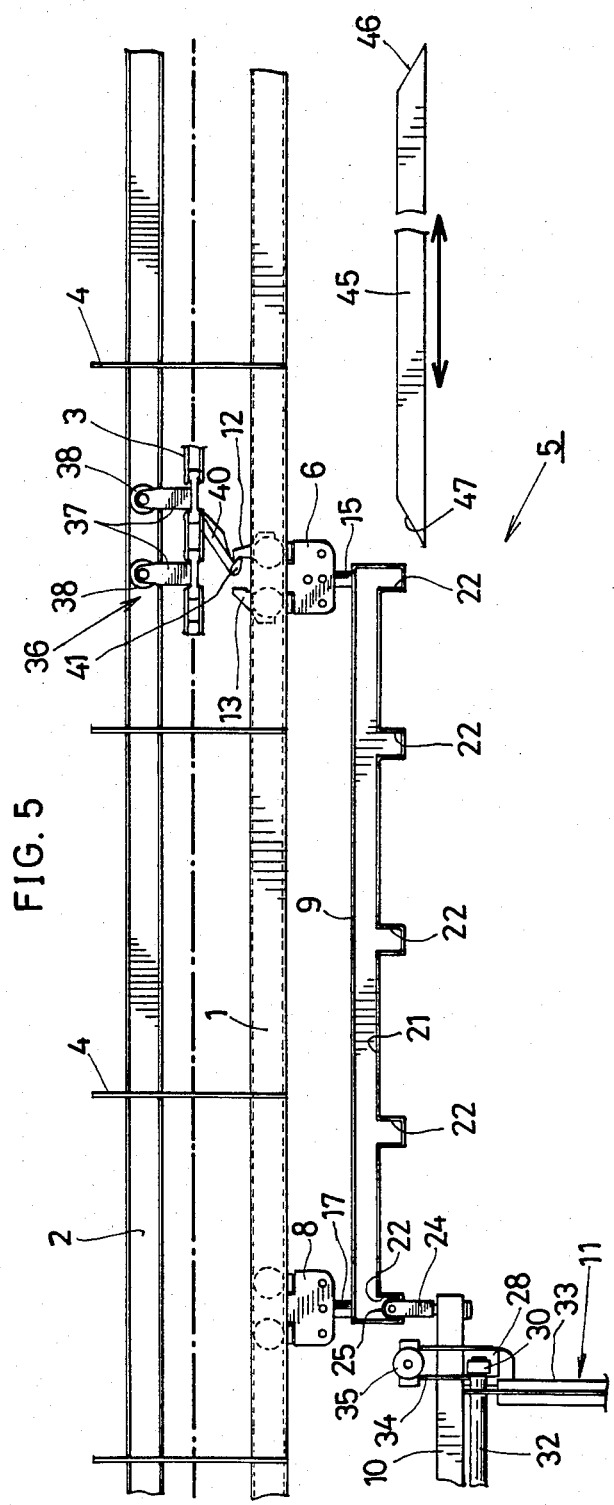

POWER-AND-FREE CONVEYOR

BACKGROUND OF THE INVENTION

The present invention relates to a power-and-free conveyor.

Throughout the specification and claims, the terms "front" and "rear" are used based on the direction of advance of the carrier. Thus the term "front" refers to the direction in which the carrier advances, and the term "rear" to the opposite direction. Further the term "lateral" refers to a direction transverse to the conveyor line.

In the case where large elongated articles, such as motor vehicles, are transported by a power-and-free conveyor, a collision is likely to occur between the articles on two carriers when one carrier is approaching the other.

To avoid such a collision during the transport of large articles on the power-and-free conveyor, carriers are used which comprise, for example, three free trolleys, connecting bars interconnecting the free trolleys and a hanger connected to one or both of the bars. The carrier is so adapted that the article supported on the hanger will not project from either of the front and rear ends of the carrier, or that even if one of the front and rear ends of the article should project from one end of the carrier, the length of the projection will be smaller than the distance between the other end of the article and the other end of the carrier.

However, such carriers, which have a considerably large overall length, require a very large space for accommodation when held out of transport operation, so that it is impossible to effectively use the space within the factory.

SUMMARY OF THE INVENTION

An object of the present invention is to provide a power-and-free conveyor usable for transporting large articles and comprising carriers which can be accommodated in a reduced space when not in use for transporting large articles.

Another object of the invention is to provide a power-and-free conveyor comprising carriers the length of which are adjustable in accordance with the length of the articles to be transported.

The power-and-free conveyor of the present invention comprises a carrier including front, rear and intermediate free trolleys at least three in number, a first connecting bar supported by the intermediate free trolley and one of the front and rear free trolleys, a rail provided on the first connecting bar and extending along the conveyor line, at least two roller trap portions formed in the rail and spaced apart by a predetermined distance longitudinally of the rail, a second connecting bar supported by the first connecting bar and the other of the front and rear free trolleys, and a roller supported by the second connecting bar as projected thereabove and rollingly movable along the rail; and a roller releasing device for releasing the roller from the trap portion and returning the roller onto the rail.

For the transport of an article, the roller is caused to fall into the trap portion of the rail which portion is most proximate to the second connecting bar. When the carrier is not used for transport, the roller is brought out of the trap portion by the releasing device, and the second connecting bar is pushed toward the first connecting bar, thereby causing the roller to roll on the rail and fall into the trap portion remotest from the second connecting bar. Consequently the carrier becomes shorter than when transporting an article and can therefore be accommodated in a smaller space. When three or more roller trap portions are provided, the length of the carrier is adjustable according to the length of the article to be transported.

The present invention will become more apparent from the following description of the preferred embodiments with reference to the accompanying drawings.

BRIEF DESCRIPTION OF THE DRAWINGS

FIG. 5 is a side elevation corresponding to part of FIG. 1 and showing another embodiment of the invention.

DESCRIPTION OF THE PREFERRED EMBODIMENTS

Figure 1:
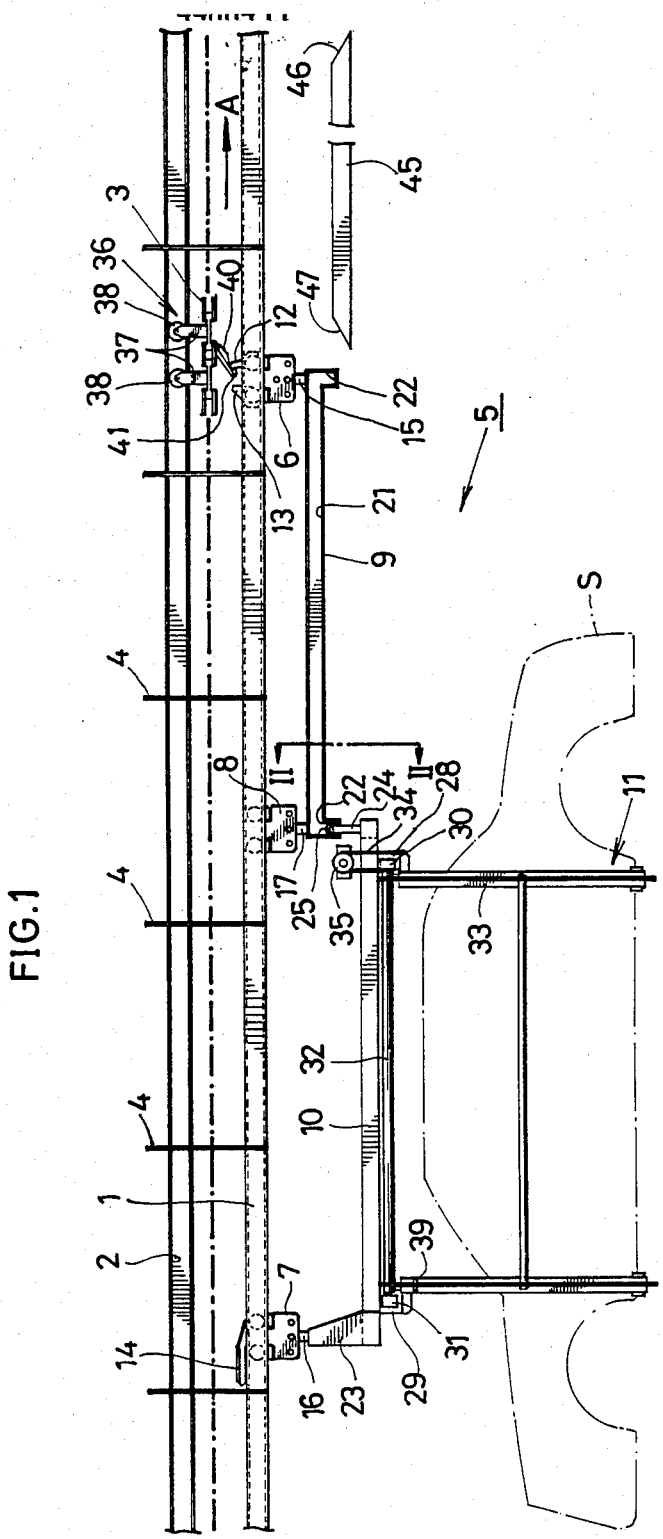
FIG. 1 is a fragmentary side elevation showing a power-and-free conveyor embodying the invention.
Figure 2:
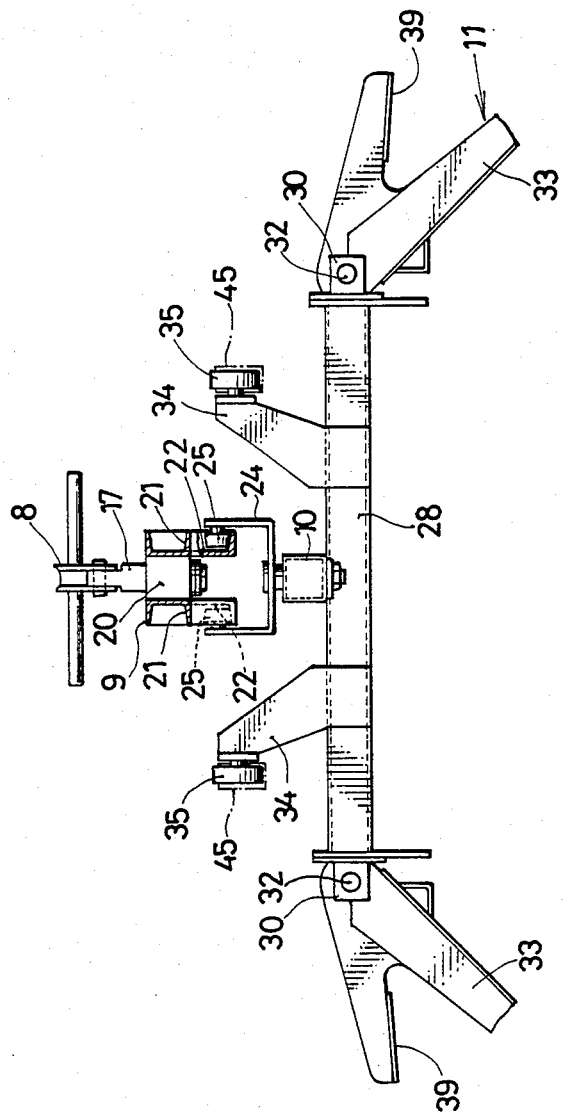
FIG. 2. is an enlarged view in section taken along the line II—II in FIG. 1 and partly broken away.
Figure 3A:
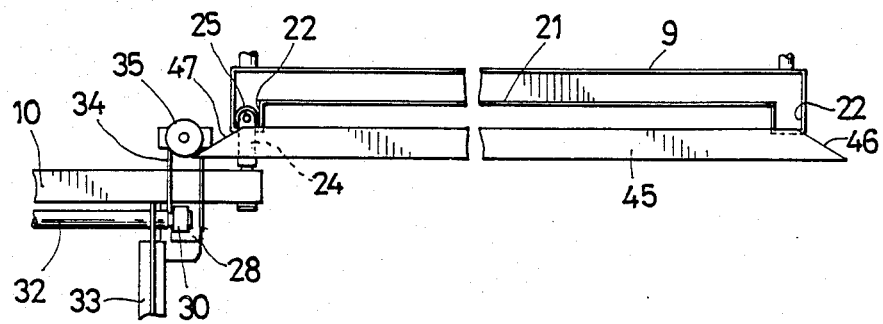
FIGS. 3 (a) to (d) show the operation of a roller releasing device.
Figure 3B:
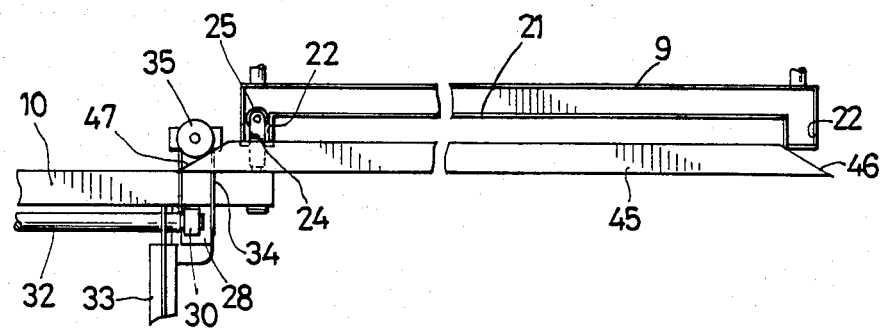
Figure 3C:
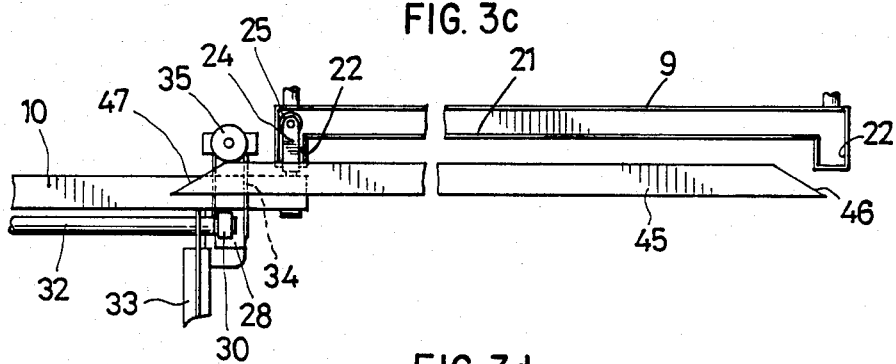
Figure 3D:
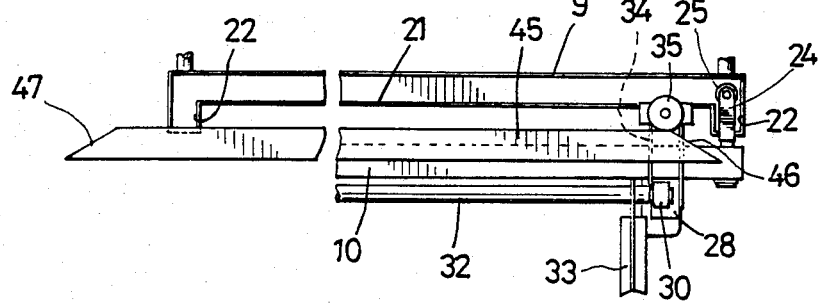

A power-and-free conveyor comprises a free rail 1 and a power rail 2 disposed above the free rail 1 at a specified distance therefrom. The power rail 2 is endless in conformity with the shape of an endless drive chain 3 provided therebelow. The free rail 1 comprises a pair of steel channel members arranged at a predetermiend spacing with their channels inwardly opposed to each other. The power rail 2 comprises a steel I beam. The free rail 1 and the power rail 2 are connected together by frames 4 arranged at a predetermined spacing.

Carriers 5 are movably supported by the free rail 1. The carrier 5 comprises a front free trolley 6 having a pair of front and rear tilting dogs 12, 13, a rear free trolley 7 having a cam 14 projecting rearward for raising a propelling member, an intermediate free trolley 8 positioned approximately midway between the front and rear free trolleys 6, 7, a front connecting bar 9 supported by the front and intermediate free trolleys 6, 8, a rear connecting bar 10 supported by the rear free trolley 7 and the front connecting bar 9, and an openable hanger 11 attached to the rear connecting bar 10.

The free trolleys 6, 7, 8 are movably supported by the free rail 1 and provided at their lower ends with downwardly projecting suspending members 15, 16, 17 which are pivotally movable forward or rearward. The front and rear tilting dogs 12, 13 are mounted on the front free trolley 6 so as to position at the center of the free rail 1 and to tilt inward toward each other. The dogs are returnable to upright position under gravity but are restrained from tilting outward. The upper end of the front tilting dog 12 extends rearward in the form of a bill and is engageable with a horizontal portion 41 of the propelling member 40 to be described later. The propelling member raising cam 14 mounted on the rear free trolley 7 is positioned at the center of the free rail 1 and has a forwardly downward slanting surface on the upper side of its front half portion and a rear half portion projecting rearward beyond the rear free trolley 7.

The front connecting bar 9 is made up of a pair of steel channel members spaced apart by a predetermined distance and having their bottom walls opposed to each other with the channels directed outward. The channel members are connected together by block-like members 20 at their opposite ends and required portions. The lower flanges of the front connecting bar 9 serve as rails 21 extending alongside the free rail 1. The rollers 25 to be described later are rollingly movable on the rails 21. Each of the rails 21 is formed at its front and rear ends with roller trap portions 22 projecting downward. The lower end of the trap portion 22 has a bottom plate for preventing the roller 25 from falling off. Thus the roller 25 is adapted to rest on the bottom plate. The rear connecting bar 10 comprises a steel member having a square cross section and a connecting member 23 projecting upward from its rear end. The rear connecting bar 10 is further provided on the upper side of its front end with a bracket 24 which is channel-shaped when seen from the front and rear and includes a pair of walls laterally opposed to each other at a predetermined spacing. The roller 25 is rotatably mounted on the inner side of each of the walls of the bracket 24. The suspending members 15, 17 of the front and intermediate free trolleys 6, 8 are horizontally rotatably attached at their lower ends to the connecting members 20 at the opposite ends of the bar 9, whereby the front and intermediate free trolleys 6, 8 are made to support the front connecting bar 9. The lower end of the suspending member 16 of the rear free trolley 7 is attached to the connecting member 23 horizontally rotatably, and the rollers 25 are retained in the rear end trap portions 22 of the front connecting bar 9, whereby the rear connecting bar 10 is supported by the rear free trolley 7 and the front connecting bar 9.

The hanger 11 comprises horizontal lateral members 28, 29 attached to the front and rear ends of the rear connecting bar 10 on the bottom side thereof, a pair of opposite rods 32 extending between and rotatably supported by brackets 30, 31 projecting from and secured to the opposite ends of the lateral members 28, 29, and a pair of opposed article support members 33 fixed at their upper ends to the rods 32. A lever 39 projects outward from the rear end top portion of each of the support members 33. When the outer ends of the levers 39 are pushed up, for example, by hydraulic cylinders (not shown), the rods 32 are rotated to open the support members 33. A pair of laterally opposed brackets 34 extend upward from the front lateral member 28, as positioned on opposite sides of the rear connecting bar 10. A roller 35 mounted on the upper end of each bracket 34 on the outer side thereof is rotatable in an approximately vertical plane in parallel with the conveyor line.

Power trolleys 36 are freely movably mounted on the power rail 2. The power trolley 36 comprises a pair of upstanding arms 37 and a pair of rollers 38 mounted on the upper ends of the arms and rollable on the lower horizontal flanges of the power rail 2 to move along the rail 2. The drive chain 3 extending below the power rail 2 is driven at all times in the direction of arrow A in FIG. 1 by unillustrated electric motor and transmission means. The lower ends of the arms 37 of the power trolley 36 are connected to the drive chain 3. The power trolleys 36 are in pairs, which are arranged at a given spacing along the conveyor line. The trolleys 36 of each pair are interconnected by the link plate of the drive chain 3, and a bracket fixed to the lower side of the link plate projects downward. The propelling member 40 mounted on the bracket is pivotally movable upward and downward and suspended therefrom to project rearwardly downward under gravity. The propelling member 40 has a hook-shaped lower end which provides the aforementioned horizontal portion 41. The carrier 5 is movable forward with the drive chain 3 by virtue of the engagement of the horizontal portion 41 with the front tilting dog 12 of the front free trolley 6.

Near the entrance of a section for accumulating carriers 5 which are not in use for transporting articles, roller releasing cams 45 positioned below the free rail 1 in parallel therewith are arranged in the paths of movement of the rollers 35. Each of the cams 45 has approximately the same length as the front connecting bar 9. The cam 45 has a forwardly downward slanting surface 46 on the upper side of its front end and a rearwardly downward slanting surface 47 on the upper side of its rear end. Preferably the cam 45 is movable, for example, vertically or laterally. The rollers 35 are adapted to come into contact with the rear ends of the cams 45 immediately before the front tilting dog 12 is brought out of engagement with the propelling member 40 by a disengaging member (not shown) disposed at the accumulating section, when the carrier 5 reaches the section.

When articles S, such as motor vehicles, are to be transported by the power-and-free conveyor, the carrier 5 is set in the state of FIG. 1, with the article S supported by the hanger 11. At this time, the front and rear connecting bars 9 and 10 preferably have such a length that the length of rearward projection of the article S beyond the rear free trolley 7 is smaller than the distance between the front end of the article S and the front free trolley 6. Even if the carrier 5 approaches another preceding carrier 5 in this state, the front end of the article S will not strike against the rear end of the article on the preceding carrier.

Figure 4:
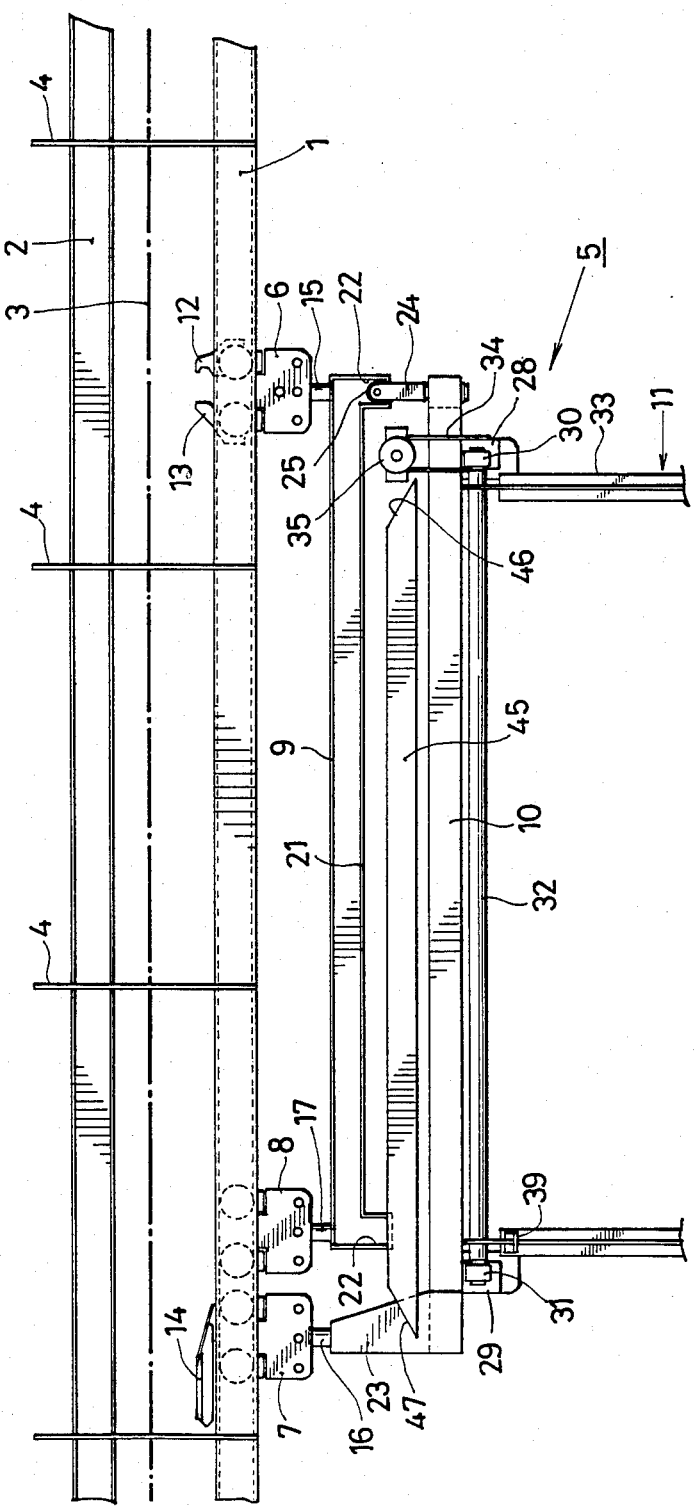
FIG. 4 is a fragmentary side elevation showing a carrier in a standby position as retained in an accumulation section.

When the carrier 5 is to be brought into a standby position in the accumulation section after the article S has been unloaded from the hanger 11 thereof, the carrier 5 is driven to the accumulation section by the power trolley 36, whereupon the rollers 35 come into contact with the rear ends of the cams 45 immediately before the front tilting dog 12 is freed from the propelling member 40 by the disengaging member on the free rail in the vicinity of the entrance of the section (see FIG. 3 (a)). When the rollers 35 start ascending the rear end slanting surfaces 47 of the cams 45 with further advance of the carrier 5, the rollers 25 retained in the rear trap portions 22 of the front connecting bar 9 also start rising while rotating (FIG. 3 (b)). When the rollers 35 have completedly ascended the slanting surfaces 47, the rollers 25 in the trap portions 22 also reach a level higher than the rails 21 (see FIG. 3 (c)). At this time, the propelling member 40 is disengaged from the front tilting dog 12 by the disengaging member to bring the carrier 5 to a halt. The rear connecting bar 10 is thereafter pushed forward manually or by a hydraulic cylinder or the like, permitting the rollers 25 to rollingly move forward on the rails 21 of the front connecting bar 9 and the rollers 35 to roll forward on the cams 45. With a further movement of the rollers 35 to the front ends of the horizontal portions of the cams 45, the rollers 25 reach the position above the front end trap portions 22. The rollers 35 then start descending the front end slanting surfaces 46 of the cams 45, causing the rollers 25 also to descend while rotating (see FIG. 3 (d)) to fall into the trap portions 22. Consequently the carrier 5 is retained in the accumulation section with its length shortened to approximately one half the length during transport as seen in FIG. 4.

The carrier can be retored to the original state by bringing the rollers 25 out of the front end trap portions 24 with roller releasing cams 45 disposed at the exit of the accumulation section and pushing the rear connecting bar 10 from behind.

Preferably the free rail 1 and the power rail 2 are inclined forwardly downward in the vicinity of the entrance to the accumulation section to bring the carrier 5 to a stop in this section. The rollers 35 can then be caused to ride onto the cams 45 without pushing the rear connecting bar 10 forward as by a hydaulic cylinder.

FIG. 5 shows another embodiment of the present invention, which has the same construction as the one shown in FIGS. 1 to 4 except that each rail 21 of the front connecting bar 9 has more than two roller trap portions 22 arranged at a predetermined spacing longitudinally thereof and that the roller releasing cams are movable along the conveyor line. With this embodiment, each roller 25, when in the rear end trap portion 22, is forced out therefrom by the cam 45 as is the case with the embodiment of FIGS. 1 to 4. After each roller 25 and each roller 35 have been rolled forward on the rail 21 and the cam 45, respectively, by a distance corresponding to the spacing between the rear end trap portion 22 and another trap portion 22 for the roller 25 to be retained in, the cam 45 is shifted rearward, whereby the roller 25 can be caught in the desired trap portion 22. Accordingly the length of the carrier 5 is adjustable suitably in accordance with the length of the article to be transported.

The present invention may be embodied differently without departing from the spirit and basic features of the invention. Accordingly the embodiments herein disclosed are given for illustrative purposes only and are in no way limitative. It is to be understood that the scope of the invention is defined by the appended claims rather than by the specification and that various alterations and modifications within the definition and scope of the claims are included in the claims.

What is claimed is:

1. A power-and-free conveyor comprising:
   a carrier including at least front, rear and intermediate free trolleys, a first connecting bar supported by the intermediate free trolley and one of the front and rear free trolleys, a rail provided on the first connecting bar and extending along the conveyor line, at least two roller trap portions formed in the rail and spaced apart by a predetermined distance longitudinally of the rail, a second connecting bar supported by the first connecting bar and the other of the front and rear free trolleys, and a roller supported by the second connecting bar as projected thereabove and rollingly movable along the rail, and
   a roller releasing device for releasing the roller from the trap portion and returning the roller onto the rail.

2. A power-and-free conveyor as defined in claim 1 wherein the roller releasing device comprises a cam follower provided on the second connecting bar and a roller releasing cam disposed in the path of travel of the carrier and positioned in the path of movement of the cam follower.

3. A power-and-free conveyor as defined in claim 2 wherein the cam follower is a roller rollingly movable along the cam.

4. A power-and-free conveyor as defined in claim 2 wherein the roller releasing cam is movable vertically and/or laterally of the conveyor line.

5. A power-and-free conveyor comprising:
   a carrier including front, rear and intermediate free trolleys, a first connecting bar supported by the intermediate free trolley and one of the front and rear free trolleys, a rail provided on the first connecting bar and extending along the conveyor line, two roller trap portions each formed at each longitudinal end of the rail, a second connecting bar having a hanger and supported by the first connecting bar and the other of the front and rear free trolleys, and a roller supported by the second connecting bar and positioned toward the first connecting bar, the roller being projected above the second connecting bar and rollingly movable along the rail, and
   a roller releasing device for releasing the roller from the trap portion and returning the roller onto the rail, the device comprising a roller releasing cam disposed at a required position in the path of travel of the carrier and having approximately the same length as the first connecting bar, and a roller supported by and spared above the second connecting bar and rollingly movable along the cam.

6. A power-and-free conveyor comprising a carrier including at least front, rear and intermediate free trolleys, a first connecting bar supported by the intermediate free trolley and one of the front and rear free trolleys, a rail provided on the first connecting bar and extending along the conveyor line, at least two roller trap portions formed in the rail and spaced apart by a predetermined distance longitudinally of the rail, a second connecting bar supported by the first connecting bar and the other of the front and rear free trolleys, and a roller supported by and spaced above the second connecting bar and rollingly movable along the rail.

* * * * *